United States Patent
Jalkanen et al.

(10) Patent No.: US 9,088,862 B2
(45) Date of Patent: Jul. 21, 2015

(54) USE OF MULTIPLE NFC TAGS

(75) Inventors: Janne Jalkanen, Espoo (FI); Palash Mukhopadhyay, Helsinki (FI)

(73) Assignee: THINGLINK OY, Helsinki (FI)

( * ) Notice: Subject to any disclaimer, the term of this patent is extended or adjusted under 35 U.S.C. 154(b) by 124 days.

(21) Appl. No.: 13/269,576

(22) Filed: Oct. 8, 2011

(65) Prior Publication Data

US 2013/0088330 A1 Apr. 11, 2013

(51) Int. Cl.
  *G06K 7/01* (2006.01)
  *H04W 4/00* (2009.01)
  *H04B 5/00* (2006.01)

(52) U.S. Cl.
  CPC .................................... *H04W 4/008* (2013.01)

(58) Field of Classification Search
  CPC . H04W 4/008; G06F 17/30882; H04L 67/12; H04L 67/34
  USPC ..................... 340/10.1, 10.6, 568.6; 345/156; 455/41.1, 419
  See application file for complete search history.

(56) References Cited

U.S. PATENT DOCUMENTS

| 8,718,547 B2 * | 5/2014 | Isomursu et al. ............. 455/41.1 |
| 2011/0169729 A1 * | 7/2011 | Holleis et al. ................. 345/156 |
| 2012/0218082 A1 * | 8/2012 | Deluca .......................... 340/10.1 |
| 2013/0059534 A1 * | 3/2013 | Sobalvarro et al. .......... 455/41.1 |

FOREIGN PATENT DOCUMENTS

EP 2337323 A1 6/2011

OTHER PUBLICATIONS

Francisco Borrego-Jaraba, A NFC-based pervasive solution for city touristic surfing, Jan. 2011, XP019955157.*
European Search Report, EP Application No. 12187389.7, mailed Feb. 8, 2013.
Borrego-Jaraba, Francisco; et al.: "A NFC-based pervasive solution for city touristic surfing," Personal and Ubiquitous Computing, Springer Verlag, LO, vol. 15, No. 7, Jan. 18, 2011, pp. 731-742.

* cited by examiner

*Primary Examiner* — Brian Zimmerman
*Assistant Examiner* — Bhavin M Patel
(74) *Attorney, Agent, or Firm* — Ziegler IP Law Group, LLC

(57) ABSTRACT

A computer implemented method including: maintaining, in a storage, information about one or more sets of tags, wherein each set of tags comprises two or more tags, receiving, from a user device, a request for content relating to a certain tag, wherein the request comprises an identifier, identifying, on the basis of the identifier and the information maintained in the storage, a set of tags that comprises said certain tag, and returning, to the user device, information about content relating to said certain tag and information about content relating to at least one other tag belonging to said identified set of tags.

15 Claims, 3 Drawing Sheets

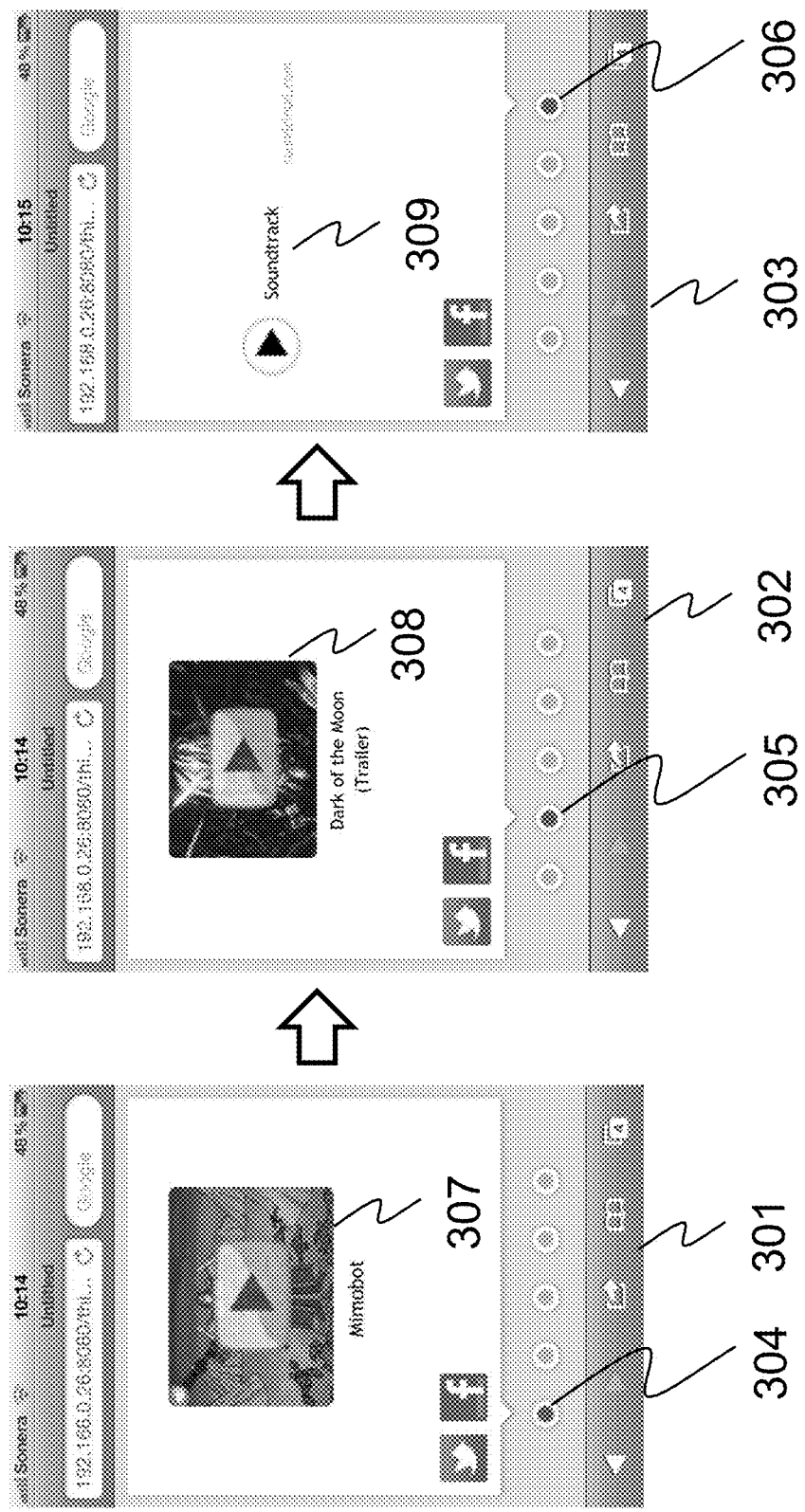

USE OF MULTIPLE NFC TAGS

TECHNICAL FIELD

The present invention generally relates to near field communication (NFC) tags and to use of multiple NFC tags.

BACKGROUND ART

Near Field Communication (NFC) is a form of short range communication technology enabling devices in close proximity with each other to interact. At least one of the interacting devices need to be an active device that initiates contact to the other device. The other device may be a passive device such as a passive Radio Frequency Identification (RFID) tag, which returns its content upon query by the active device. That is, in one operating mode, an active NFC device reads passive RFID or NFC tags. This allows various interactions between the users and their surroundings.

Smart posters are one application domain in which NFC can be used. A smart poster is a regular poster or a billboard or a sign that has one or more embedded NFC tags and a user may achieve different kind of actions by tapping (touching) the tags with an NFC enabled device (such as a mobile phone or other handheld device with NFC capabilities).

SUMMARY

Various aspects of the invention provide new and inventive solutions that can be used in connection with smart posters or the like.

According to a first example aspect of the invention there is provided a method according to enclosed independent method claims.

According to a second example aspect of the invention there is provided an apparatus according to enclosed independent apparatus claims.

According to a third example aspect of the invention there is provided a memory medium according to enclosed independent memory medium claims.

Different non-binding example aspects of the present invention have been illustrated in the foregoing.

BRIEF DESCRIPTION OF THE DRAWINGS

The invention will be described, by way of example only, with reference to the accompanying drawings, in which:

FIG. 3 illustrates a user interface according to an example embodiment; and

DETAILED DESCRIPTION

A basic principle agreed on in relation to NFC tags is that there should be a "single tap—single action"—methodology. That is, when a user taps on a tag with an NFC enabled device, the device directly connects to one single web site.

Unfortunately, this principle makes it complicated to build rich content for smart posters. There is little or no context for multiple tags within the same smart poster or other target entity.

One possible solution is to include in the tag a menu, from which the user may select multiple options. Or one might assume that users simply stay in from of the poster long enough to tap all (or multiple) tags in the poster. These solutions are however not optimal.

An embodiment of the invention provides for tags an intermediate layer which comprises references or links to all other tags within the same smart poster or other multi-tag entity or set of tags. In this way there is provided a user interface from which users can access all other tags within the entity or the set of tags through one tag of the entity, i.e. by tapping or touching a single tag.

Embodiments of the invention relate especially to use of NFC tags, but equally the principles can be used in connection with other tags that can be read over a short range communication connection, e.g. by touching the tag with a reader device.

An example embodiment provides a computer implemented method and a device implementing the method. The method comprises maintaining, in a storage, information about one or more sets of tags, wherein each set of tags comprises two or more tags, receiving, from a user device, a request for content relating to a certain tag, wherein the request comprises an identifier, identifying, on the basis of the identifier and the information maintained in the storage, a set of tags that comprises said certain tag, and returning, to the user device, information about content relating to said certain tag and information about content relating to at least one other tag belonging to said identified set of tags. In an example embodiment there is maintained, in the storage, for each set of tags, an identifier of the set of tag, and identifiers of tags belonging to the set of tags, and information about content relating to the tags belonging to the set of tags.

Figure 1A:
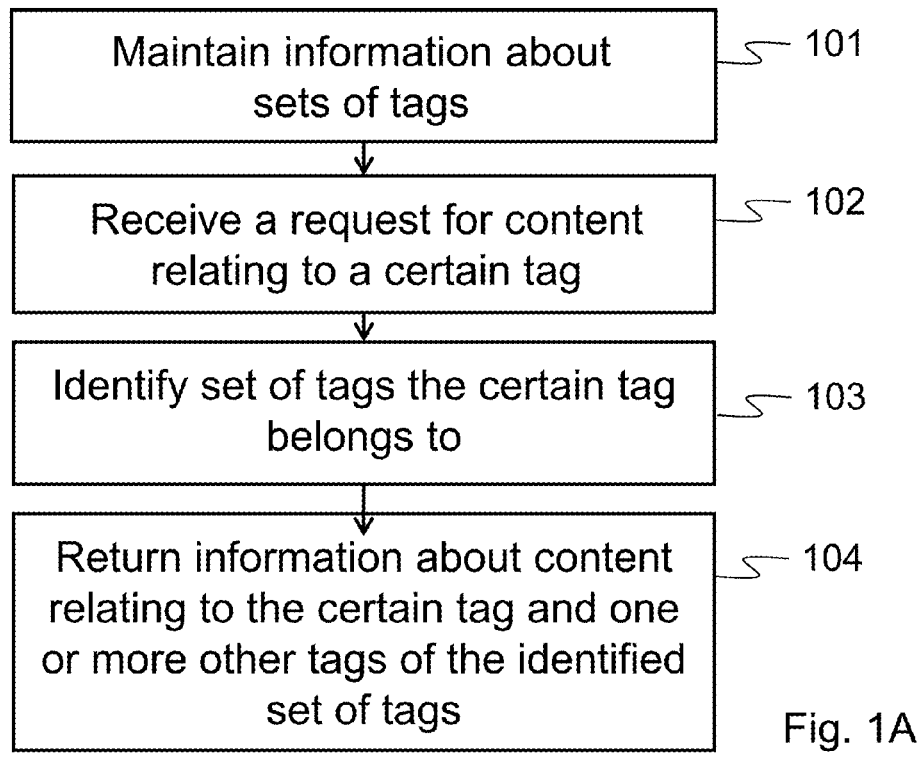
FIG. 1A shows a flow diagram of a method according to an example embodiment.

FIG. 1A shows a flow diagram of a method according to an example embodiment. The method may be implemented in a backend server.

In phase 101, a there is maintained, in a storage, information about sets of tags. Each set of tags may be related to a smart poster, for example. The information that is maintained for the sets of tags includes for example identifiers of the tags included in the set and content of the tags included in the set (or a reference to content of the tags included in the set, e.g. an address to a location storing the content). Additionally, the information may include an identifier of the set of tags (e.g. an identifier of an individual smart poster) and/or an identifier of the type of the set of tags (e.g. an identifier of a type of smart poster). The type of the set of tags is practical for example in cases where there are many instances of the same smart poster in different places and the tags in different instances of the same smart poster are identical. In that case there is no need to maintain tag information separately for all smart posters of the same type. Instead one record for the type of the smart poster may suffice.

In phase 102, a request for content relating to a certain tag is received from a user device. The request comprises one or more identifiers.

In phase 103, the set of tags the certain tag belongs to is identified on the basis of the identifier(s) included in the request and the information maintained in the storage.

In phase 104, information about content relating to the certain tag and one or more other tags included in the identified set of tags is returned to the user device. In an example embodiment, information about the content of all tags belonging to the identified set of tags is returned. In an example embodiment the information about the content is returned in a format that is usable for providing to a user of the user device a user interface that allows switching between content of the tags of the identified set of tags. The information about the content may be delivered in a format (e.g. a computer program code) that triggers displaying such user interface. In an example embodiment, the information about the content is an URL directing a web browser of the user device to load a particular web page, which contains HTML content about the set of tags. In another embodiment, the information about the content is JSON or XML formatted structured data content, which is then rendered by an application residing on the user device.

Figure 1B:
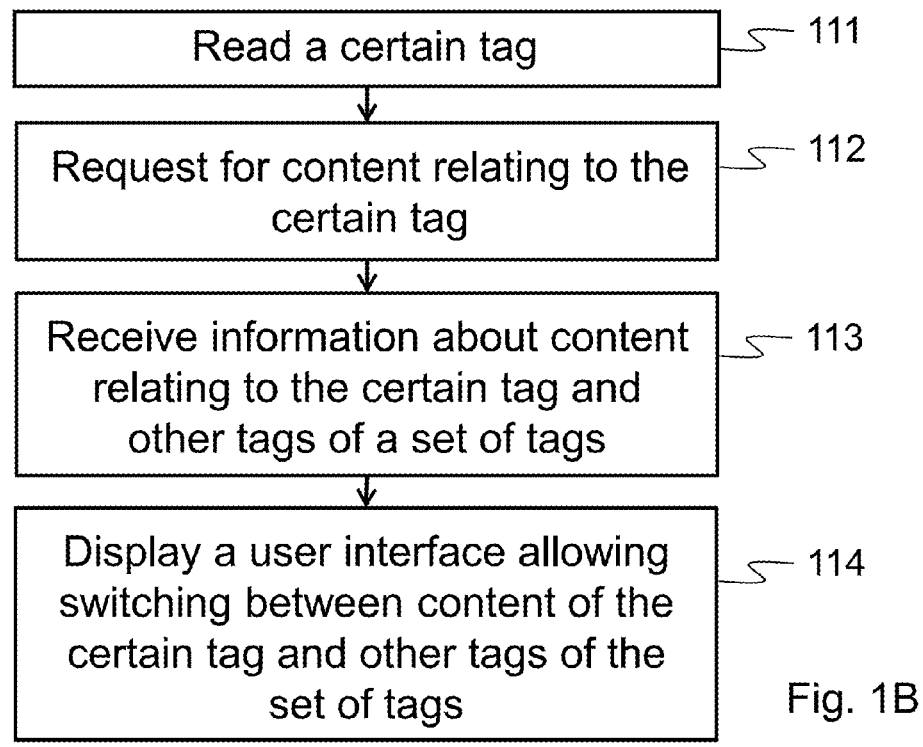
FIG. 1B shows a flow diagram of a method according to another example embodiment.

FIG. 1B shows a flow diagram of a method according to another example embodiment. The method may be implemented in a user device.

In phase 111, a certain tag is read with a user device. That is, a user of an NFC enabled device touches an NFC tag with the device.

In phase 112, content relating to the certain tag is requested from a backend service according to information read from the certain tag. That is, the information read from the certain tag automatically directs the user device to contact the backend service. The request that is sent to the backend service comprises one or more identifiers obtained from the certain tag. There may be a unique identifier of the certain tag, a unique identifier of a set of tags the certain tag belongs to (e.g. an identifier of an individual smart poster) and/or an identifier of a type of the set of tags the certain tag belongs to (e.g. an identifier of a type of smart poster).

In phase 113, the user device receives information about content relating to the certain tag and information about content relating one or more other tags belonging to the same set of tags with the certain tag.

In phase 114, the user device displays to the user of the user device a user interface that allows switching or browsing between content of the certain tag and one or more other tags belonging to the same set of tags with the certain tag.

After this the user of the user device is able to access contents of all tags in a particular set of tags without having to tap any other tags. That is, the user may for example leave a smart poster and still has access to the whole content of the smart poster.

Figure 2:
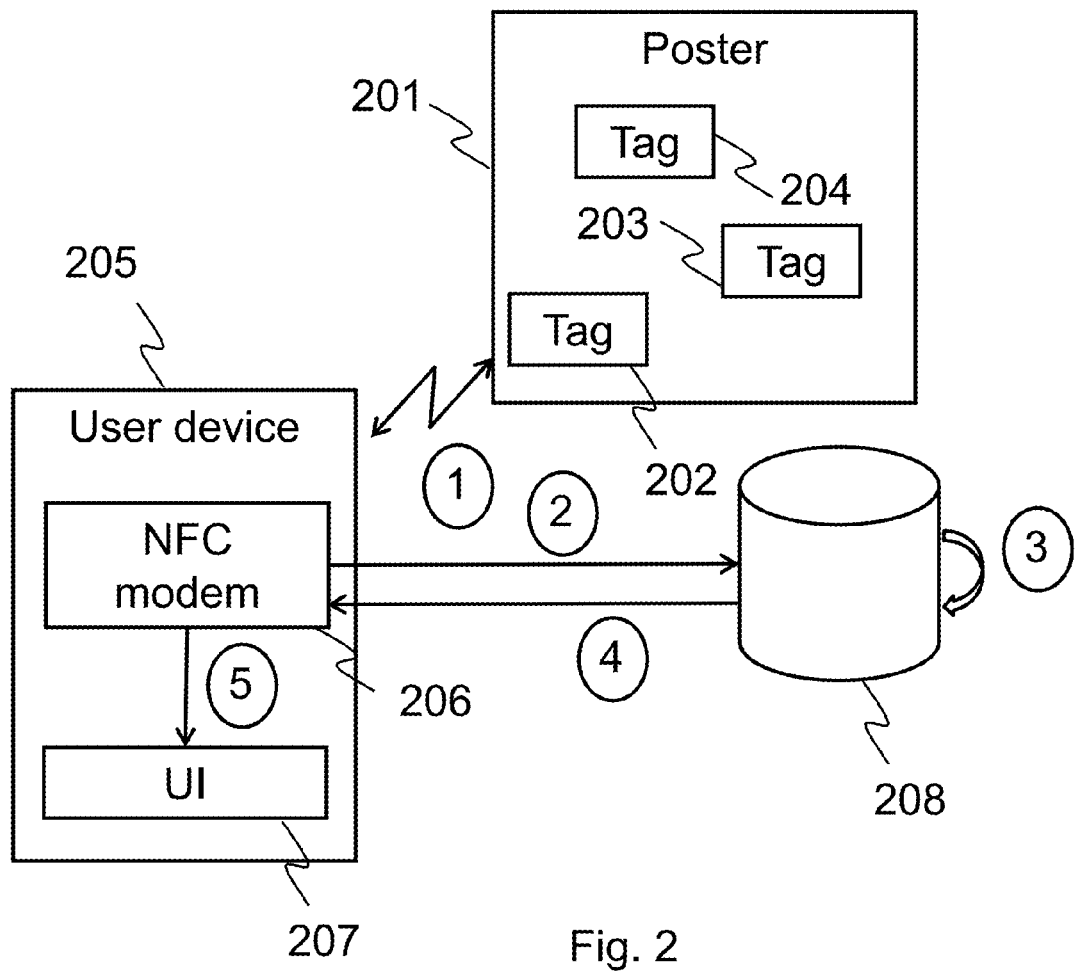
FIG. 2 shows a scenario according to an example embodiment.

FIG. 2 illustrates a scenario in which the methods of FIGS. 1A and 1B can be implemented.

The scenario of FIG. 2 comprises a poster 201 (a billboard or a sign) that comprises three electronic tags 202-204 such as an NFC tags. Further the scenario comprises a user device 205 capable of reading electronic tags, such as the tags 202-204, and a backend storage or service 208. The backend storage may comprise for example a database. The user device 205 comprises an NFC modem and a user interface module 207. Clearly the user device 205 may comprise various other modules and components as well, but those are not shown here for the sake of clarity.

The backend service 208 may implement for example the method of FIG. 1A and the user device 205 may implement for example the method of FIG. 1B.

The circled numbers in FIG. 2 illustrate operation according to an example embodiment:

1. The user device 205 reads the tag 202 by using the NFC modem 206. In practice, the user of the user device 205 taps or touches the tag 202 with the user device 205.
2. The user device 205 (or more particularly the NFC modem 206) contacts the backend service 208 on the basis of the content of the tag 202 and sends to the backend service 208 an identifier associated with the tag 202.
3. The backend service 208 identifies a set of tags the tag 202 belongs to on the basis of the identifier associated with the tag 202.
4. The backend service 208 returns to the user device 205 information about content relating to tag 202 and information about content relating to other tags belonging to the same set of tags with the tag 202.
5. On the basis of the received information the user device 205 provides to the user of the user device 205 a user interface 207 that allows switching between content of the tag 202 and content of other tags belonging to the same set of tags with the tag 202.

FIG. 3 illustrates three different views 301-303 in a user interface according to an example embodiment.

The views 301-303 comprise circles 304-306, which illustrate which tag is currently shown on the display. By selecting different circles a user can switch from one tag to another tag. In the shown example there is a set of tags including five different tags (five circles). The first view 301 shows content 307 of a first tag, the second view 302 shows content 308 of a second tag and the third view 303 shows content 309 of a fifth tag.

It must be noted that the user interface 300 of FIG. 3 is only one possible visual implementation example and that browsing or switching between content of different tags can be implemented by means of different graphical elements to provide visually altered user interface. For example different windows or lists can be used in the user interface.

In an example embodiment the tags that belong to a set of tags (e.g. tags of a particular smart poster) are all regular tags (e.g. NFC tags) that can be read with compatible reading devices (e.g. NFC readers). In another example embodiment some of the tags in a set are regular physical tags that can be read with a reading device and some of the tags in the set of tags are virtual tags. There may be one or more of both in a particular set. A virtual tag behaves like a regular tag in the user device after the content of the tags belonging to the set of tags are fetched to the user device, but the content of a virtual tag cannot be read directly from the tag. That is, a virtual tag does not need to contain the electronic circuits included in a regular tag. In yet another example embodiment only one of the tags in a set is a regular physical tag that can be read with a reading device and all other tags in the set of tags are virtual tags. In that case for example a smart poster comprises only one point from which the tag information can be read into a user device. Nevertheless the information that is eventually fetched into the user device may include information relating to any desired point of the smart poster.

Embodiments of the present invention may be implemented in software, hardware, application logic or a combination of software, hardware and/or application logic. The software, application logic and/or hardware may be part of a backend system of a service provider (such as the backend system 208 of FIG. 2).

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or some other electronic device, with an example of such device described and depicted in FIG. 4 below. The computer-readable medium may be a digital data storage such as a data disc or diskette, optical storage, magnetic storage, or opto-magnetic storage. The computer-readable medium may be formed into a device without other substantial functions than storing memory or it may be formed as part of a device with other functions, including but not limited to a memory of a computer, a chip set, and a sub assembly of an electronic device.

Figure 4:
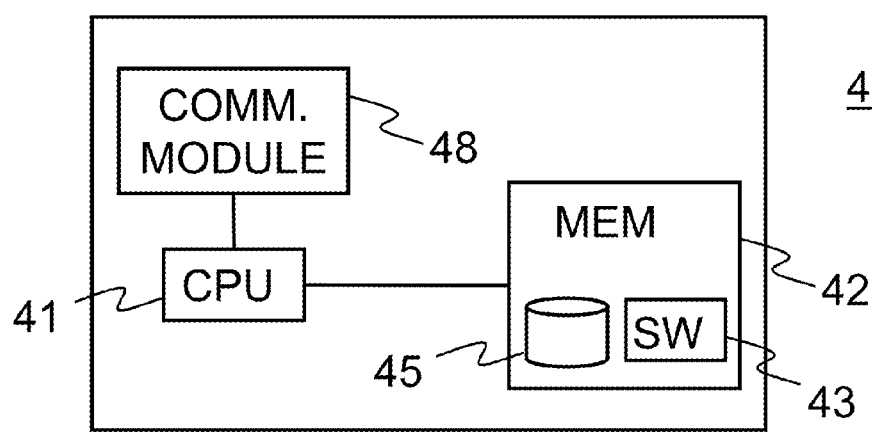
FIG. 4 shows a block diagram of an apparatus according to an example embodiment.

FIG. 4 shows an example block diagram of an apparatus 40 according to certain example embodiments of the invention. The apparatus 40 may be implemented on a general purpose computer or a server for example and it may provide the backend service 208 of FIG. 2.

The apparatus 40 comprises at least one memory 42 configured to store computer program code (or software) 43. The memory 42 may comprise a database 45, but this is not mandatory. The apparatus 40 further comprises at least one processor 41 for controlling the operation of the apparatus 40 using the computer program code 43. Additionally the apparatus 40 comprises a communication module 48.

The processor 41 may be a master control unit (MCU). Alternatively, the processor 41 may be a microprocessor, a digital signal processor (DSP), an application specific integrated circuit (ASIC), a field programmable gate array, a microcontroller or a combination of such elements. FIG. 4 shows one processor 41, but the apparatus 40 may comprise a plurality of processors 41.

The memory 42 may be, for example, random access memory, flash memory, hard disk, hard disk array, optical storage, memory stick, memory card and/or magnetic memory. The apparatus 40 may comprise a plurality of memories. The memory 42 may be constructed as a part of the apparatus 40 or it may be inserted into a slot, port, or the like of the apparatus 40 by a user. The memory 42 may serve the sole purpose of storing data, or it may be constructed as a part of an apparatus serving other purposes, such as processing data. The database 45 may be for example an SQL-database. The database may be used for storing information relating to tags according to various embodiments of the invention.

The communication module 48 may be for example a fixed line communication module, e.g. an Ethernet or LAN communication module or even a radio communication module, e.g., a WLAN, GSM/GPRS, or WCDMA radio module.

The processor 41 in combination with the computer program 43 and the communication module 48 is configured to implement at least some features of various embodiments of the invention described above.

A skilled person appreciates that in addition to the elements shown in FIG. 4, the apparatus 40 may comprise other elements, such as batteries, microphones, displays, as well as additional circuitry such as input/output (I/O) circuitry, memory chips, and the like.

Various embodiments of the invention provide the following advantageous effects

1. A user is allowed to pick up the entire contents of a smart poster or other multi-tag entity or set of tags (contents of all tags within the poster/entity) with one single tap.
2. It may be possible to create smart posters more cost effectively than before as one physical tag may suffice for providing the effect of having multiple tags. At least some of the other tags may be virtual tags.
3. Creating a richer environment for the tags is enabled.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:
1. A computer implemented method comprising:
maintaining, in a storage of a backend service, content of one or more sets of Near Field Communication (NFC) tags, wherein each set of NFC tags comprises two or more NFC tags, and wherein each NFC tag from each set of NFC tags is located on a smart poster and all NFC tags of one set of NFC tags are located on the same smart poster;
receiving, from a user device to the backend service, a request for content relating to a certain NFC tag on the same smart poster, wherein said certain NFC tag is the NFC tag read by the user device and wherein the request comprises an identifier;
returning the requested content to the user device;
identifying in the backend service, on the basis of the identifier, the set of NFC tags located on the smart poster that comprises said certain NFC tag;
and
returning from the backend service to the user device content of at least one other tag belonging to said identified set of NFC tags, wherein the content of the at least one other NFC tag is returned to the user device without the user device reading said at least one other NFC tag.

2. The method of claim 1, wherein each NFC tag from the identified set of NFC tags is disposed on the smart poster.

3. The method of claim 1, wherein the identifier comprises a unique identifier of said certain NFC tag.

4. The method of claim 1, wherein the identifier comprises a unique identifier of the set of NFC tags that said certain NFC tag belongs to.

5. The method of claim 1, wherein the identifier comprises a unique identifier of a type of the set of NFC tags that said certain NFC tag belongs to.

6. The method of claim 1, further comprising:
maintaining, in the storage, for each set of NFC tags, the identifier of the set of NFC tag, and identifiers of NFC tags belonging to the set of NFC tags, and content relating to the NFC tags belonging to the set of NFC tags.

7. The method of claim 1, wherein said content relating to said certain NFC tag and said content relating to at least one other NFC tag belonging to said identified set of NFC tags are returned in a form of computer code configured to instruct the user device to display a user interface that allows switching between content relating to said certain NFC tag and content relating to said at least one other NFC tag belonging to said identified set of NFC tags without the user device reading the at least one other NFC tag.

8. The method of claim 1, wherein said content relating to said certain NFC tag and said content relating to at least one other NFC tag belonging to said identified set of NFC tags are returned in a form of an address to a web source comprising said content relating to said certain NFC tag and said content relating to at least one other NFC tag belonging to said identified set of NFC tags.

9. An apparatus configured to provide a backend service, the apparatus comprising:
- a storage configured to maintain content of one or more sets of NFC tags, wherein each set of NFC tags comprises two or more NFC tags, and wherein each set of NFC tags is associated with a smart poster and all NFC tags of one set of NFC tags are associated with the same smart poster;
- a processor; and
- a non-transitory memory including computer program code; wherein the memory and the computer program code in combination with the processor, are configured to cause the apparatus to perform:
- receiving, from a user device, a request for content relating to a certain NFC tag, wherein said certain NFC tag is the NFC tag read by the user device and wherein the request comprises an identifier;
- returning the requested content to the user device;
- identifying, on the basis of the identifier and the content of the one or more sets of NFC tags maintained in the storage, the set of NFC tags that comprises said certain NFC tag;
- returning, to the user device responsive to the request and the identified set of NFC tags that comprises said certain NFC tag, content of at least one other NFC tag belonging to said identified set of NFC tags, wherein the content of the at least one other NFC tag is returned to the user device without the user device reading said at least one other NFC tag.

10. The apparatus of claim 9, wherein each tag from the identified set of NFC tags is disposed on the same smart poster.

11. The apparatus of claim 9, wherein the identifier comprises at least one of: a unique identifier of said certain NFC tag, a unique identifier of the set of NFC tags wherein said certain NFC tag belongs to, and a unique identifier of a type of a set of NFC tags said certain NFC tag belongs to.

12. The apparatus of claim 9, wherein the memory and the computer program code in combination with the processor, are configured to cause the apparatus to perform:
- maintaining, in the storage, for each set of NFC tags, the identifier of the set of NFC tags, and identifiers of NFC tags belonging to the set of NFC tags, and content of each NFC tag belonging to the set of NFC tags.

13. The apparatus of claim 9, wherein the memory and the computer program code in combination with the processor, are configured to cause the apparatus to perform:
- returning said content of said certain tag and said content of the at least one other NFC tag belonging to said identified set of NFC tags in a form of a computer code configured to instruct the user device to display a user interface that allows switching between content relating to said certain NFC tag and content relating to said at least one other NFC tag belonging to said identified set of NFC tags.

14. The apparatus of claim 9, wherein the memory and the computer program code in combination with the processor, are configured to cause the apparatus to perform:
- returning said content relating to said certain NFC tag and said content relating to at least one other NFC tag belonging to said identified set of NFC tags in a form of an address to a web source comprising said content relating to said certain NFC tag and said content relating to at least one other NFC tag belonging to said identified set of NFC tags.

15. A non-transitory memory medium embodying computer executable program code configured to be executed by a processor of an apparatus, to cause the apparatus to perform:
- maintaining, in a storage of a backend service, content associated with one or more sets of NFC tags, wherein each set of NFC tags comprises two or more NFC tags, wherein each set of NFC tags is associated with a smart poster and all NFC tags of one set of NFC tags are associated with the same smart poster;
- receiving, from a user device, a request for content relating to a certain NFC tag of the same smart poster, wherein said certain NFC tag is the NFC tag read by the user device and wherein the request comprises an identifier;
- returning the requested content from the backend service to the user device;
- identifying in the backend service, on the basis of the identifier and the content associated with the one or more sets of NFC tags maintained in the the storage, the set of NFC tags associated with the same smart poster that comprises said certain NFC tag;
- returning, from the backend service to the user device responsive to the request, content of at least one other NFC tag belonging to said identified set of NFC tags, wherein the content of the at least one other NFC tag is returned to the user device without the user device reading said at least one other NFC tag.

* * * * *